United States Patent [19]

Harvey et al.

[11] 4,084,099

[45] Apr. 11, 1978

[54] WIDE SCANNING ANGLE SENSOR

[75] Inventors: Ronald B. Harvey, Minneapolis; Gerald R. Strunc, Maple Grove; Dwayne H. Putzke, Brooklyn Center, all of Minn.

[73] Assignee: Pako Corporation, Minn.

[21] Appl. No.: 765,630

[22] Filed: Feb. 4, 1977

[51] Int. Cl.$^2$ .............................................. G01N 21/30

[52] U.S. Cl. ...................................... 250/548; 226/45; 250/561

[58] Field of Search ............... 250/212, 561, 570, 548; 226/45

[56] References Cited

U.S. PATENT DOCUMENTS

| | | | |
|---|---|---|---|
| 3,849,660 | 11/1974 | Hommerin | 250/570 |
| 3,919,561 | 11/1975 | Coberly | 250/548 X |

FOREIGN PATENT DOCUMENTS

| | | | |
|---|---|---|---|
| 1,388,579 | 3/1975 | United Kingdom | 250/548 |

OTHER PUBLICATIONS

*Radio Shack Dictionary of Electronics* 1974, pp. 422, 423.

*Primary Examiner*—James B. Mullins

*Attorney, Agent, or Firm*—John W. Adams

[57] ABSTRACT

An improvement for use with an automatic print cutter mechanism which is actuated by sensing control indicia positioned along a continuous strip of photographic prints, said improvement comprising a wide scanning angle sensor capable of detecting said indicia of numerous configurations when same are misaligned with respect to the center line of said sensor and means for independent lateral and transverse adjustment of said sensor.

7 Claims, 8 Drawing Figures

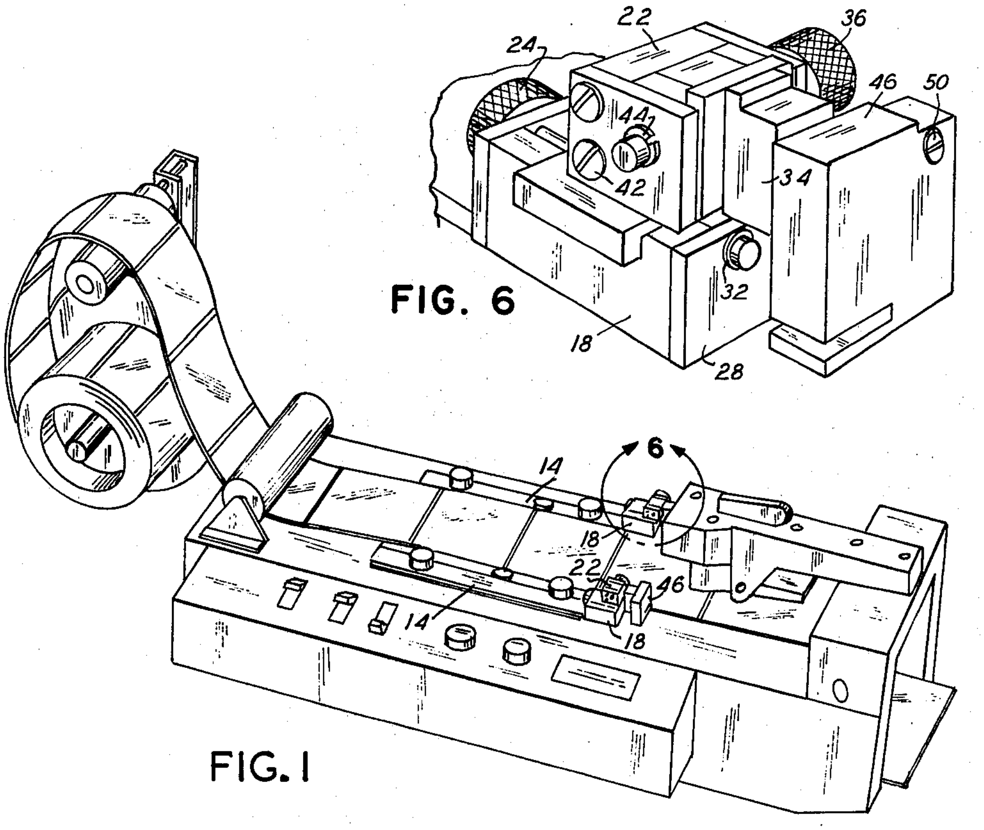
FIG. 6
FIG. 1
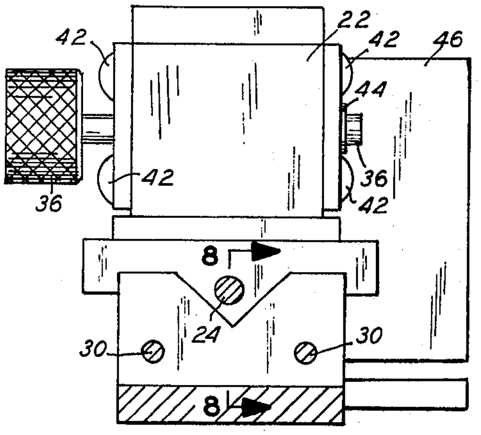
FIG. 7
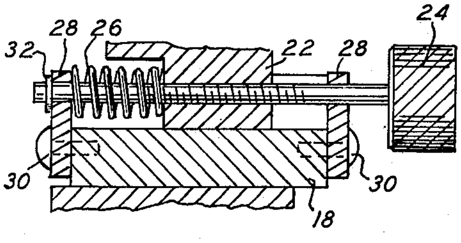
FIG. 8

WIDE SCANNING ANGLE SENSOR

BACKGROUND OF INVENTION

A large number of orders are processed in a normal work day in a modern photographic processing plant. To expedite the processing, orders containing film of a similar type and size are spliced together for developing. After developing, the film images are printed in an edge-to-edge relationship on a continuous strip of photo sensitive paper by a printer apparatus. The printer apparatus places indicia in the margin to indicate the cutting line between adjacent prints and a seond mark in the opposite margin to indicate the end of an order. The cutter apparatus senses the cutting indicia and separates individual prints from the strip. The separated prints are passed to an order packaging device which groups the prints in response to the end of order marks sensed by the cutter. Thus it may be seen that in a system of this type it is important to positively identify the cutting line between finished prints to provide a means to control an automatic print cutter apparatus.

To be a viable apparatus, the cutter must accommodate the numerous differences that are encountered when dealing with the work product of various photo printers in photographic processing plants. Among these differences is the cutting and end of order indicia configuration. These indicia may vary from a rectangle of approximately 0.030 × 0.093 inches to a circle of approximately 0.050 inch diameter depending on the manufacturer of the photo printer. Another variable frequently encountered is the placement of the control indicia from print to print. Experience has shown that deviation in indicia placement may be as large as 0.125 inch laterally from the sensing path center line. The indicia is usually in the form of punched holes or marks on the edge of the strip of prints. The sensing means of previous cutters has demonstrated a high sensitivity to both indicia placement and configuration due to a relatively narrow scanning angle afforded by a photosensitive transistor employed as the sensing element.

Another shortcoming of prior indicia sensors is that the sensor was attached to the cutter device photographic strip guide means. Thus, as adjustments were made in guide positioning to accommodate variations in the width of the photographic strip, the sensor position was likewise effected. The necessary realignment of the sensor was then accomplished by a trial and error procedure in which a highly experienced operator would loosen the sensor mounting screws and realign the sensor to pick up the indicia on the strip.

In the past phototransistors have been used as sensing elements. These elements have a very restricted scanning area which was thought to be an advantage because there would be less chance of a false indicia being sensed. However with the high speed equipment now in use this restricted sensing area has produced the problems outlined above.

The concept of using a wide angle sensing element provides an extremely simple solution to these problems and furthermore the discovery that a photovoltaic or solar cell as the sensing element produces the desired wide angle sensing area and provides the means for implementing this concept. In addition to the wide angle sensing capability of the photovoltaic cell the characteristic of such a cell is to provide a straight line or logarithmic energy producing ratio which is directly proportional to the area on which the radiation source is imposed. This is not true with the phototransistor sensors previously used with such equipment. Solar cell elements are normally used for the conversion of infrared energy to electrical current. However, in the application herein described this element is employed as a wide angle sensor of infrared energy and provides a substantial increase in sensing area and the width thereof when compared to the phototransistor of prior applications.

The invention also provides separation of the sensor mounting means from the photographic strip guide means. Thus, with different film sizes variations in the width of the photographic strip are encountered and the guide means may be repositioned accordingly without affecting placement of the sensor means. This invention also provides for micrometer type adjustments of the sensor means in planes both parallel and normal to the photographic strip for adjusting the sensor position for the various film sizes. These adjustments expedite the cutter set-up procedure. These enhancements are designed for retrofit into existing Pako Model 255 and 255B cutters.

The following is a description of the specific embodiment of this improvement illustrated in the accompanying drawings wherein like reference characters refer to similar parts throughout the views in which:

FIG. 1 is a perspective view of the Pako Model 255 cutter with the wide scanning angle sensor and improved adjusting means indicated;

FIG. 6 is an enlarged perspective view of the wide angle sensor and adjustment means;

FIG. 7 is a sectional view of the sensor lateral adjustments, taken substantially along viewing line 7—7 of FIG. 2, illustrating the V way; and FIG. 8 is a sectional view of the sensor lateral adjustment taken substantially along viewing line 8—8 of FIG. 7, illustrating the adjusting mechanism and compression spring.

DETAILED DESCRIPTION

A wide scanning angle sensor with independent lateral and transverse axis adjustment means is shown attached to a Pako Model 255 cutter in FIG. 1. The sensor and adjustment means is illustrated in an enlarged scale in FIG. 6. With the wide angle sensor concept the only adjustment of the sensor that is necessary is to convert from one size film to another. The wide angle scanning characteristic of the sensor adapts to normal variations and inaccuracies in indicia configuration, size and placement in a continuous roll of prints which contain a large number of individual orders and from which the individual prints must be cut and separated into the respective orders.

Figure 3:
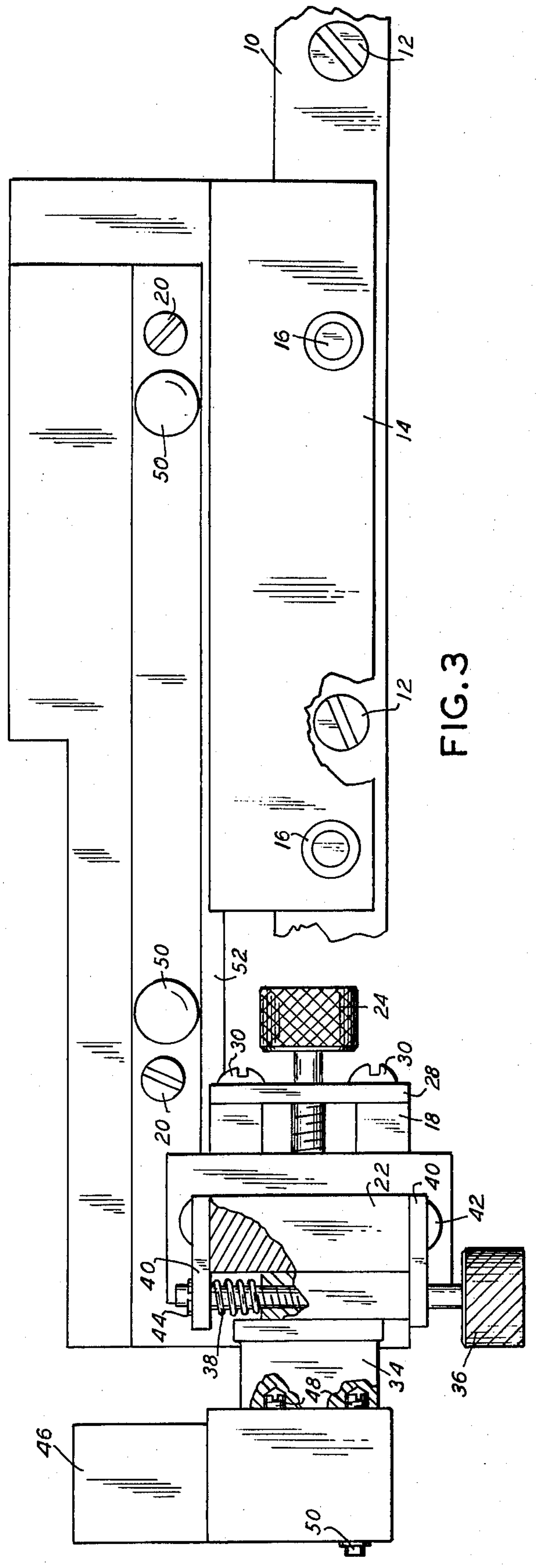
FIG. 3 is a top plan view of the wide scanning angle sensor illustrating the lateral and transverse adjustments as well as the photographic strip guide means with sections removed to illustrate detail.
Figure 2:
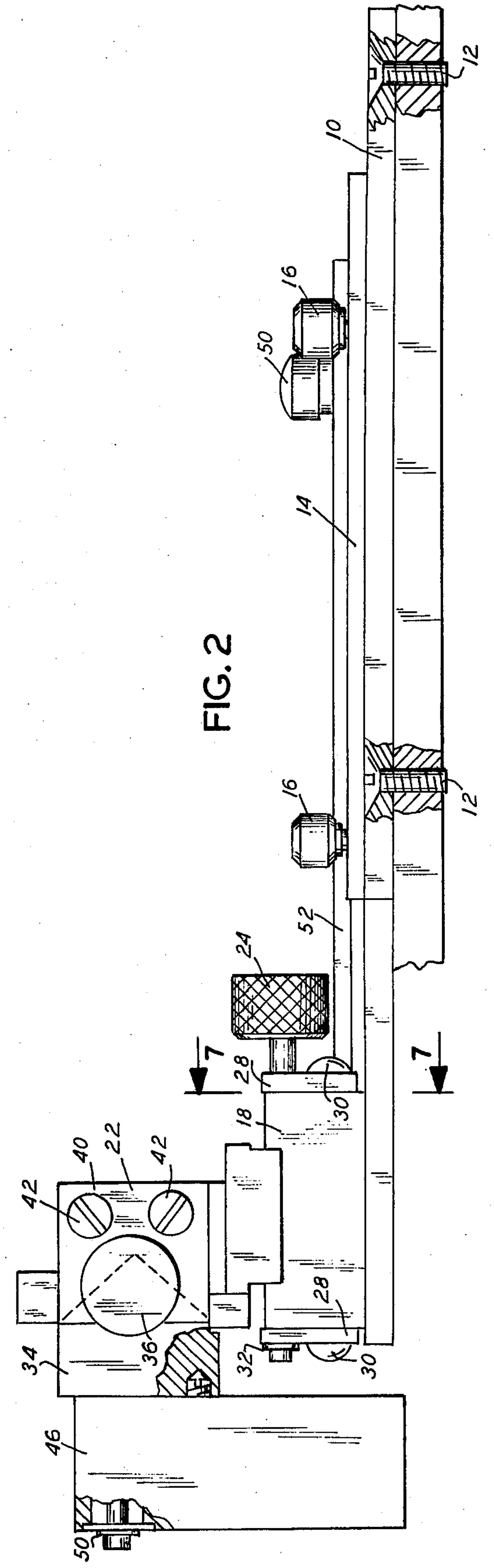
FIG. 2 is a rear elevational view of the wide scanning angle sensor and transverse adjusting means with sections removed to illustrate the detail.

Mounting guide rail 10 is attached to frame assembly 521-1059 as by mounting screws 12 engaging threaded holes provided in said frame assembly as illustrated in FIGS. 2 and 3. Frame assembly 521-1059 is best seen in Illustrated Parts List for Pako Model 244 cutters, Form 72-1R3 FIG. 1. Sensor mounting assembly 14 is attached to mounting guide rail 10 as by screws 16 engaging threaded holes in said guide rail. Fixed lateral slide block 18 as best illustrated in FIG. 2 is attached to sensor mounting assembly 14 as by screws 20. Said lateral slide block 18 is configured to provide a longitudinal V shaped as best illustrated in FIG. 7. Movable lateral slide block 22 provides a threaded hole and a longitudinal V shaped protrusion to engage the V shaped groove provided in fixed lateral slide block 18. Knurled head lateral sensor adjusting screw 24 engages a threaded hole provided in said movable slide block assembly 22 as seen in FIG. 8. Said lateral sensor adjusting screw 24 with compression spring 26 installed thereon is rotatably attached to the fixed lateral slide block 18 as by end plate 28 and mounting screws 30. Compression spring 26 is retained in a compressed state as by split snap ring 32 engaging an axial groove provided on lateral adjusting screw 24. The previously described assembly provides lateral adjustment of movable slide block 22 by rotation of said lateral sensor adjusting screw 24 while compression spring 26 maintains loading on said adjusting screw and movable slide block to remove end play and prevent tolerance buildup.

Movable lateral slide block 22 provides a transverse V shaped groove positioned as best illustrated in FIG. 2. Sensor mounting slide 34 provides a threaded hole and a V shaped protrusion to engage the V shaped groove provided in said fixed lateral slide block. Knurled head transverse sensor adjusting screw 36 engages the threaded hole provided in said sensor mounting 34. Said transverse sensor adjusting screw 36 with sensor mounting 34 and compression spring 38 installed as best shown in FIG. 3 is rotatably attached to said lateral slide block 22 as by end plates 40 and mounting screws 42. Compression spring 38 is retained in a compressed state between end plate 40 and sensor mounting plate 34 by split snap ring 44 engaging an axial groove provided in said transverse sensor adjusting screw 36. This assembly provides transverse adjustment of the sensor mount slide 34 by rotating knurled head transverse sensor adjusting screw 36 while compression spring 38 maintains loaded on said adjusting screw and said sensor mounting slide to remove end play and prevent tolerance buildup.

Figure 4:
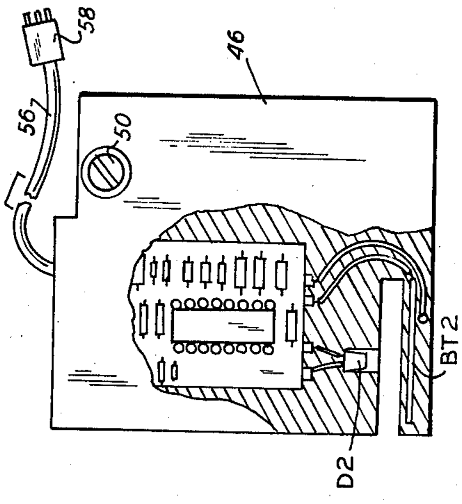
FIG. 4 is a fragmentary right elevational view of the wide scanning angle sensor taken principally along viewing line 4—4 in FIG. 2. To illustrate the detail of the infrared emitter, the photovoltaic cell and the sensor electronics assembly detail.

Sensor assembly 46 is positioned on said sensor mounting slide 34 as by locating screws 48 engaging a hole provided therein, and attached thereto as by sensor mounting screw 50. Infrared source D2 and photovoltaic cell BT2 and the sensor electronics illustrated in FIG. 5 are positioned within sensor assembly 46 and maintained therein as by molding with a resin compound as best illustrated in FIG. 4.

The inherent characteristics of the phototransistors previously used for the sensing elements are so limited in the scanning area as to prevent the same from operating successfully as a wide angle sensing element, even the use of a lens system. When used with the equipment presently being marketed. The wide angle sensing area required to produce the desired universal sensing function for a successful print cutting operation must be capable of providing a sensing area having a width of at least 0.250 inches when installed in its operative position. The photovoltaic cell herein designated at a BT2 meets these requirements and increases the width of the sensing area very substantially over the width permitted by the use of a phototransistor indicia sensing element.

Photographic strip guide 52 is attached as by thumb screws 54 engaging threaded holes provided in sensor mounting assembly 14. Guide 52 is adjusted while thumb screws 54 are in a loosened state.

Figure 5:
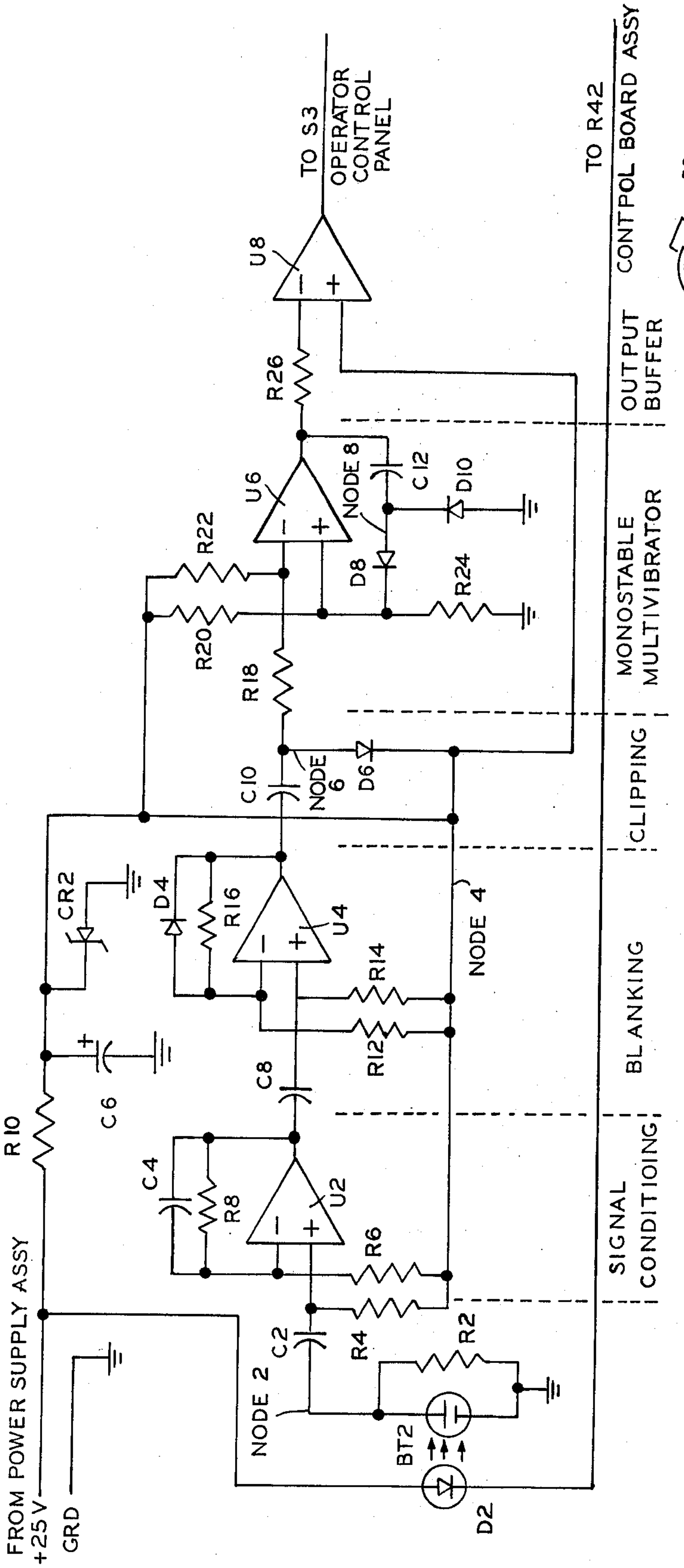
FIG. 5 is an electrical schematic of the light emitting diodes and photovoltaic cell in the wide scanning angle sensor improvement.

The electronics for the improved hole sensor are illustrated in FIG. 5. All components are commercially available and are not critical to the design, however slight modifications in amplifier frequency compensation may be necessary if major changes are made. The quadruple differential amplifiers commercially available are type 4136 as supplied by Ratheon Semiconductor Division or equivalent, signal diodes are JEDEC type 1N4305 or equivalent, zener diode CR2 is a commercially available 12 volt device, resistors are ¼ watt carbon composition, capacitors are ceramic with the exception of C6 which is a 35v electrolytic.

The electronics illustrated in FIG. 5 are mounted in sensor assembly 46 as illustrated in FIG. 4. Electrical interconnection is made by cable assembly 56 and plug 58 which is compatible with existing sockets on Pako Model 255 cutters.

The cathode of 12 volt zener diode CR2 is connected to NODE 4 and the anode connected to ground. Resistor R10 is connected between +25 volt source and NODE 4. The positive plate of electrolytic capacitor C6 is connected to NODE 4, the negative plate to ground. The interconnection of diode CR2, resistor R10 and capacitor C6 as previously described provide a +12 volt reference at 4 and is used throughout the electronics.

The anode of infrared emitting diode D2 is connected to the +25 supply contained in the paper cutter, the cathode of diode D2 is connected to a current resistor located within the paper cutter. Photovoltaic cell BT2 is connected with the positive terminal, connected to NODE 2, the negative terminal connected to ground. Resistor R2 is connected in parallel with said photovoltaic sensor. Capacitor C2 is connected between NODE 2 and the noninverting input of differential amplifier U2. The interconnection of devices BT2, R2 and C2 as previously described provide a translation of the output of photovoltaic cell BT2 to approximately +12.

Resistor R4 is connected between the non-inverting input of differential amplifier U2 and NODE 4. Resistor R6 is connected between the inverting input of differential amplifier U2 and NODE 4. Capacitor C4 with resistor R8 connected in parallel are connected between the output of differential amplifier U2 and the inverting input. The previously described interconnection of differential amplifier U2, resistors R4, R6 and R8 and capacitor C4 provide a shaping circuit to condition the translated output of photovoltaic cell BT2.

Resistor R12 is connected between the inverting input of differential amplifier U4 and NODE 4. Resistor R14 is connected between the noninverting input of differential amplifier U4 and NODE 4. Resistor R16 is connected between the output and inverting input of differential amplifier U4. The cathode of diode D4 is connected to the output of differential amplifier U4. The anode of diode D4 is connected to the inverting input of differential amplifier U4. Capacitor C8 is connected between the output of differential amplifier U2 and the noninverting input of differential amplifier U4.

Components R12, R16, D4 and differential amplifier U4 provide a blanking function.

Resistor R20 is connected between NODE 4 and the noninverting input of differential amplifier U6. Resistor R22 is connected between NODE 4 and the inverting input of differential amplifier U6. Resistor R24 is connected between the noninverting input of differential amplifier U6 and ground. The cathode of diode D8 is connected to the noninverting input of differential amplifier U6, the anode to NODE 8. The anode of diode D10 is connected to ground and the cathode to NODE 8.

Capacitor C12 is connected between the input of differential amplifier U6 and NODE 8. Capacitor C10 is connected between the output of differential amplifier U4 and NODE 6. The anode of diode D6 is connected to NODE 6, the cathode of diode D6 is connected to NODE 4. Resistor R18 is connected between NODE 6 and the inverting input of differential amplifier U6. Components R20, R22, R24, diodes D8 and D10, capacitor C12 and differential amplifier U6 interconnected as previously described form a monostable multivibrator with a time constant of approximately 15 msec.

Resistor R26 is connected between the output of differential amplifier U6 and the inverting input of differential amplifier U8. The noninverting input of differential amplifier U8 is connected to NODE 4. The output of differential amplifier U8 is provided to switch S3 as best illustrated in FIG. 14 of the electrical diagrams for Pako Models 255 and 255B as previously described.

The end of order indicia are detected by a wide scanning angle sensor with independent axis adjustment capability as previously described, attached to the front frame assembly of the cutter. This assembly is identical to the improvement herein described, however configured to position the sensor and adjustment knobs appropriately for the front frame mounting. This reconfiguration requires fabricating a mounting guide rail similar to, but reversed from, component 10 illustrated in FIGS. 2 and 3. The lateral slide block assembly is assembled as shown attached to the reversed mounting guide rail. The transverse slide block assembly is then assembled with the adjusting screw and way subassembly reversed as allowed by the intrinsic symmetry of the components. Sensor assembly 46 is then attached to sensor mounting plate 34 in a reversed manner. The assembly is then attached to the front frame assembly 521-1059.

A cutter configured with two wide scanning angle sensors as described provides the capability to accommodate a roll of uncut prints with cutting indicia on either margin as would result if a roll of prints were inadvertently rolled backwards, for instance. The Pako Model 255 cutter provides switching capability to allow operator to choose which sensor will actuate the cutter. The other sensor will then become the end of order sensor. These switches are schematically illustrated in Electrical Diagrams for Pako Model 255 cutter, form 27-026R1 page 12.

It will, of course, be understood that various changes may be made in the form, details, arrangement and proportions of the parts without departing from the scope of this invention, which generally stated is set forth in the appended claims.

What is claimed is:

1. An improvement for use with a photographic print cutter mechanism which includes a power driven strip conveyor for conveying a strip of photographic prints having control indicia positioned along a marginal edge portion thereof, said conveyor including control means actuated by sensing the control indicia, said improvement comprising:

a wide scanning photovoltaic sensor positioned to scan the marginal edge portion of the strip which bears the control indicia, said sensor scanning an area of at least 0.250 inches wide to detect a multiplicity of different configurations, sizes and placements of said control indicia.

2. The improvement set forth in claim 1 wherein said sensor includes a source of radiant energy in the infrared spectrum.

3. The improvement set forth in claim 1 and further comprising:

a source of radiant energy, and the source of radiant energy and the wide scanning angle sensor in predetermind spaced relationship while the strip conveyor transports the strip of prints bearing the said control indicia therebetween.

4. An improvement for use with a photographic print cutter mechanism which includes a print cutter with actuating means therefor and a driven strip conveyor and which is automatically actuated by sensing control indicia positioned along a marginal edge portion of a continuous strip of photographic prints, said improvement comprising:

a wide scanning angle photovoltaic sensor positioned to scan the marginal edge portion of the strip which bears the control indicia, said sensor scanning an area of at least 0.250 inches wide to detect a multiplicity of different configurations, sizes and placements of said control indicia.

5. The improvement set forth in claim 4 wherein said sensor includes a source of radiant energy in the infrared spectrum.

6. The improvement set forth in claim 4 and further including conditioning means to condition the output of said sensor for use in controlling the cutter actuating means.

7. The improvement of claim 4 further comprising:

first adjusting means for adjusting the position the wide scanning angle photovoltaic sensor in a plane parallel to the marginal edge of the strip print;

first guide means for restricting the adjustment by the first adjusting means to the parallel plane;

second adjusting means for adjusting the position the wide scanning angle photovoltaic sensor in a plane normal to the path of the strip of prints; and second guide means for restricting the adjustment by the second adjusting means to the normal plane, wherein adjustment of the wide scanning angle photovoltaic in the planes parallel and normal to the strip are independent of one another.

* * * * *